United States Patent [19]
Groeger et al.

[11] Patent Number: 5,972,808
[45] Date of Patent: Oct. 26, 1999

[54] FIBROUS STRUCTURES WITH FINE PARTICLES

[75] Inventors: H. Gunter Groeger, Charlotte; Jason R. Malone, Matthews, both of N.C.

[73] Assignee: AQF Technologies LLC, Charlotte, N.C.

[21] Appl. No.: 08/791,679

[22] Filed: Jan. 30, 1997

[51] Int. Cl.[6] ........................................................ B32B 5/16
[52] U.S. Cl. ............................ 442/72; 442/76; 442/121; 442/122; 442/417; 428/198
[58] Field of Search ................. 442/72, 76, 121, 442/122, 417; 428/198; 55/524; 210/502.1, 504, 508

[56] References Cited

U.S. PATENT DOCUMENTS

| | | |
|---|---|---|
| 4,396,663 | 8/1983 | Mitchell . |
| 4,397,907 | 8/1983 | Rosser . |
| 4,399,185 | 8/1983 | Petrow . |
| 4,452,892 | 6/1984 | Rosevear . |
| 4,455,187 | 6/1984 | VonBlucher . |
| 5,002,814 | 3/1991 | Knack . |
| 5,143,752 | 9/1992 | Nakajima . |
| 5,221,573 | 6/1993 | Baigas . |
| 5,346,619 | 9/1994 | Funkenbusch . |
| 5,405,687 | 4/1995 | Yamamoto . |
| 5,482,773 | 1/1996 | Bair . |
| 5,486,410 | 1/1996 | Groeger . |
| 5,605,746 | 2/1997 | Groeger et al. . |
| 5,662,728 | 9/1997 | Groeger . |
| 5,674,339 | 10/1997 | Groeger et al. . |
| 5,736,473 | 4/1998 | Cohen et al. . |

Primary Examiner—Jenna Davis
Attorney, Agent, or Firm—Timothy R. Kroboth

[57] ABSTRACT

A fibrous structure comprising a fibrous matrix with surrogate particles fixed to the fibrous matrix, is provided. Functionally active, fine particles are immobilized on the fixed surrogate particles.

19 Claims, 1 Drawing Sheet

5,972,808

FIBROUS STRUCTURES WITH FINE PARTICLES

FIELD OF THE INVENTION

This invention relates to a fibrous structure with immobilized particles.

BACKGROUND OF THE INVENTION

Carrier particles for sorptive impregnants are known. Exemplary are conventional sorptive impregnants such as copper and silver salts, on activated carbon particles.

Fibrous structures containing functionally active particles are commercially available. Filter media or filters made from these structures include sorptive particles for selectively removing certain components of a liquid or gas passing through the filter. Acceptable performance with low pressure drop beneficially results from the active particles being distributed in a three dimensionally spaced apart arrangement. Advantageously, the supporting fibrous structure is stabilized by fiber-fiber bonding, and the active particles are bonded to, or entrapped in interstitial spaces of, the fibrous structure.

Fine active particles will beneficially provide more surface area for a desired end use than a comparable volume of larger particles, but there must be accessibility to the fine particles by a gas or liquid being passed through the fibrous structure. Difficulties exist when active particles are fine, in particular submicron in size. For example, control of the movement of fine particles when introducing fine particles into or onto a fibrous structure, is challenging because of the mobility or irregular motion of fine particles. Fine, mobile particles also tend to cover available fibrous surface area, and thus may interfere with subsequent fiber-fiber bonding.

Immobilization of fine, mobile particles to prevent loss during use is highly desirable. The immobilization requires adequate surface area for deposition of the fine particles. However, an equivalent volume of fine particles requires more surface area for deposition than would be required by an equivalent volume of conventionally-sized particles, for instance, having an average diameter in the range of approximately 300 to 500 microns. Enough fiber surface will typically not be available in a fibrous structure of macrofibers, for surface bonding of a useful loading of fine active particles. Additionally, the need for the fibrous structure to have an acceptably low pressure drop will typically conflict with enough fiber surface. Moreover, even if excess fiber surface were available, the immobilization must be efficient so that loss during use will be minimized.

Accordingly, an improved fibrous structure having a three dimensional arrangement of immobilized active material, is needed. Such a fibrous structure would benefit the use, and provide increased surface for the immobilization, of fine, mobile particles as the active material, but nevertheless have acceptably low pressure drop. Such a fibrous structure would advantageously provide accessibility of fine active particles to a gas or liquid being passed through the fibrous structure, yet minimize the loss of fine active particles during use.

SUMMARY OF THE INVENTION

In accordance with the present invention, an improved fibrous structure is beneficially based upon a fibrous matrix and surrogate particles supported by the fibrous matrix. By "surrogate particles" is meant particles that function as a carrier for functionally active particles.

In accordance with the invention, the surrogate particles are beneficially distributed and fixed in a three dimensional arrangement. By the term "fixed" is meant bonded to, or entrapped in interstitial spaces of, the fibrous matrix. Advantageously, the fibrous matrix is generally uniform in structure, and the three dimensional arrangement is also generally uniform.

In accordance with the invention, active particles of fine size are carried by considerably larger, surrogate particles, and there is selective deposition of fine, mobile active particles on fixed surrogate particles. The selective deposition is beneficially based upon a preferential attraction between the fine, mobile particles and the fixed surrogate particles. The methodology selected for the deposition advantageously provides for immobilization of the fine active particles on the surrogate particles.

Adequate surface area for the deposition, and accessibility to the immobilized fine particles by a liquid or gas, are benefitted by appropriate choice of the surrogate particles taking into consideration, for instance, the average size of the fine particles and physical structure of the surrogate particles. Also beneficially influencing the accessibility are deposition of the fine particles as a monolayer on the individual surrogate particles, and generally uniform, three dimensional spacing of the surrogate particles; accordingly, these features are preferred.

In a related embodiment, functionally active, fine particles are immobilized on high available surface, surrogate particles fixed in a three dimensional arrangement. In accordance with the present invention, the immobilized fine particles will typically provide the fibrous structure with a useful processing benefit, or analytical use, and/or a filtration function.

BRIEF DESCRIPTION OF THE DRAWING

Reference is now made to the accompanying drawing, which is highly illustrative, and forms a part of the specification of the present invention.

DETAILED DESCRIPTION OF THE INVENTION

Figure 1:
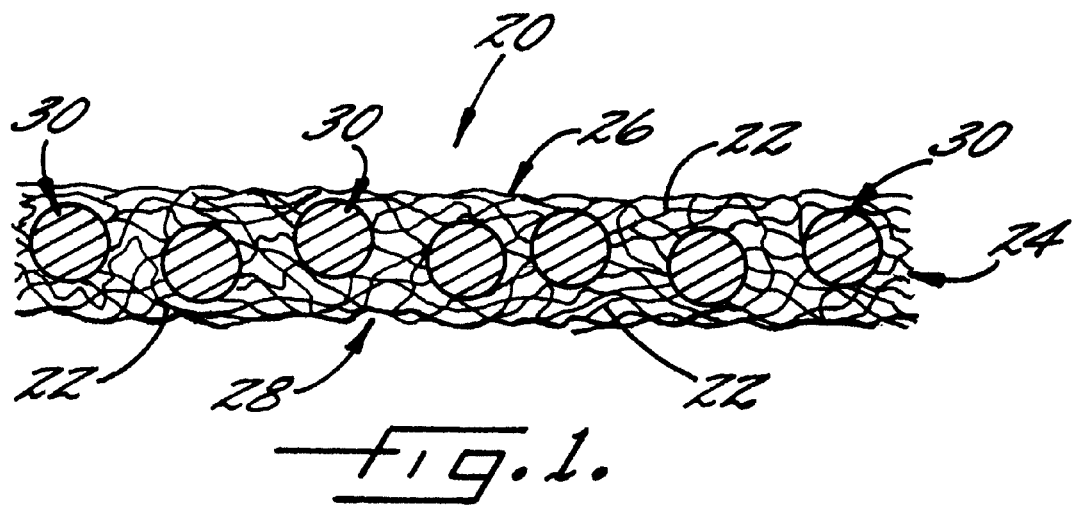
FIG. 1 is a sectional view depicting a fibrous structure containing surrogate particles, in accordance with the invention.

As indicated above, the fibrous structure of the present invention is advantageously based upon a synthetic fibrous matrix with surrogate particles distributed and fixed in a three dimensional arrangement. Such a structure will be typically non-woven, and may be made using composite fibers, a mixture of structural fibers and fusible fibers, powder bonding, or using other suitable approaches for bonding the surrogate particles to the fibrous structure. The surrogate particles may also be fixed by physical techniques such as needling and water jet entangling, which result in entrapment.

In any event, the fibrous matrix will include a structural fibrous component, and beneficially the structural component will provide structural integrity even when the fibrous matrix is highly loaded with the surrogate particles. If heat is used for fixing the surrogate particles, heat in the form of radiant heat such as IR heat, may be advantageously selected so that bonding is effected without compression or pressure-induced distortion of the surrogate particles/fibrous matrix structure; and the bonding temperature will typically be an elevated temperature in the range of from about 130 to 200° C., although an elevated temperature outside this range may be appropriate depending upon factors including the specific material for bonding the surrogate particles to the fibrous matrix.

To provide for point-of-contact bonding of the surrogate particles to the fibrous matrix, the fibrous matrix is preferably formed from composite fibers having a structural fiber component and a heat-bondable fiber component. Generally speaking, the structural component will typically melt at a temperature at least about 30 to 50° C. higher than the heat-bondable component. Preferably, the heat-bondable fiber component has high bonding capability for bonding the surrogate particles to the fibrous matrix. The bonding is preferably achieved by heating a heat-bondable, polymeric fiber component to a temperature at which it is tacky or molten, but in any event provides for adhesion. Beneficially, the heating will also provide for stabilization of the web structure by fiber-fiber bonding at the cross over points of fibers. A "spot weld" is produced by adhesion at the point of contact of individual surrogate particles with individual matrix fibers. Point-of-contact bonding advantageously minimizes undesirable coating of the surrogate particles by the bonding material, and hence unwanted reduction of the surface area of the surrogate particles available for attractive deposition and immobilization of fine, mobile active particles.

Concentric sheath-core fibers are one example of useful composite fibers. Suitable composite fibers also include eccentric sheath-core fibers, and fibers having a side-by-side configuration. Composite fibers of these types are known as bicomponent or heterofil fibers. One skilled in the art will recognize that a variety of multiconstituent fiber structures having a lower melting component exist or may be made, and will recognize that those multiconstituent fiber structures may be selected from, as useful composite fibers.

Useful fibers may be in a variety of forms including crimped and non-crimped cut staple fibers, short-cut staple, continuous filaments, and blends thereof. Advantageously, a non-woven web structure in accordance with the invention, may be dry-formed from crimped, staple fibers so as to be lofty. In addition, spunbond web structures and melt blown web structures may be used.

The structural fibers should be present in an amount sufficient to provide a matrix structure and ample surface area for fixing the surrogate particles. Typically, the fibrous matrix will be present in a minor amount compared to the loading of the surrogate particles. Although a fibrous web including surrogate particles may include from about 5% to 80% by weight of structural fiber, based on the combined weight of the surrogate particles and the structural fiber, usually only about 10 to 25 wt. % will be structural fiber unless low density surrogate particles are used.

The matrix structure will preferably be generally uniform to assist in a preferred, three dimensionally generally uniform distribution and spacing of the surrogate particles. In addition to promoting generally uniform application and deposition of fine, mobile active particles on the fixed surrogate particles, this characteristic benefits accessibility to the immobilized fine active particles by a liquid or gas. Tortuous flow paths may be provided by the three dimensionally spaced apart arrangement of the surrogate particles. The use of a compressive force or other pressure to assist fixation of the surrogate particles to the matrix structure, will work to the contrary and will therefore be avoided.

An open, generally uniform, non-woven web structure in accordance with the invention, may be beneficially dry-formed from crimped, staple macrofiber having an average diameter in excess of about 10 microns. The average diameter will typically range from about 12 to 25 microns depending upon the intended application. If desired, structural fibers of significantly different diameters may be combined to form the fibrous matrix.

For dry lay processing, the structural fiber will generally have a length to diameter ratio that is limited on the low side. On the high side, continuous length fiber may be used. For wet lay processing, if used, an appropriate length to diameter ratio of the structural fiber will be selected.

Useful fibrous structures can be built to thicknesses of from about 0.5 to 50 mm. However, if desirable, depending upon considerations including the end use, much thicker structures can be made. Stacked fibrous structures can be made.

The fibrous matrix may also include a structurally beneficial amount of stiffening fibers having a denier per filament of from 6 to 10,000 especially if the surrogate particles are relatively large in size. In addition, the fibrous matrix may include microdenier fibers. These stiffening fibers or microdenier fibers may be composite or non-composite fibers or a blend thereof. The fibrous matrix may include other fibers or filament or fibrets, depending upon the result desired.

The surrogate particles may be any particles, organic or inorganic, suitable as a carrier for fine active particles. Especially useful surrogate particles will be porous and have rough or irregular surfaces providing increased surface area for deposition. An advantageous void volume for surrogate particles is greater than about 50%, beneficially about 60 to 65%, preferably greater than 70%, very preferably about 90% or more. The surrogate particles promote or will be modified to promote selective deposition of fine, mobile particles on the surrogate particles vis-a-vis the fibrous matrix. The surrogate particles may have a useful functional activity such as sorptive activity, for the end use desired, but to be useful in this invention, that is not a requirement for the surrogate particles. Thus, the surrogate particles may be functionally inactive with respect to the desired end use. Suitable surrogate particles include carbon particles such as activated carbon, zeolite particles, alumina particles such as activated alumina, polymeric particles including, for example, styrene monomer, and absorbent particles such as commercially available superabsorbent particles. The foregoing description is intended to be representative of and not in limitation of particles suitable for use as surrogate particles in the practice of the present invention.

Particularly suitable, surrogate particles are low density, porous particles, and have pores and cavities including surface cavities, ranging in diameter from about 1 to 100 microns and interconnected by smaller pores. These pores and cavities beneficially provide inner surface for deposition, in particular monolayer deposition, of fine particles having an average size in the range of about 0.01 to 10 microns, and thereafter for accessibility to the immobilized fine particles. 1 cm3 of these surrogate particles provides in bulk approximately 75 to 1,500 sq.m. of available surface. Polymeric particles of this type are available from Biopore Corporation. By comparison, 1 cm3 of a permeable non-woven web of 15 micron average diameter fibers will provide only about 0.2 sq.m. of available surface. In accordance with the present invention, it is preferred that functionally active, fine particles be deposited on a high available surface substrate, and in particular on high available surface, surrogate particles fixed in a permeable three dimensional arrangement. By the term "high available surface" is meant at least about 5, preferably at least about 25, sq.m. of available surface per cm3. This invention is, of course, not limited to the use of high available surface, surrogate particles.

In accordance with the invention, the surrogate particles are bonded to, or entrapped within interstitial spaces of, the fibrous matrix, in a beneficially spaced apart, generally uniform, three dimensional arrangement. Heat-bonding beneficially limits migration of the surrogate particles within the structure, as well as loss from the structure. Bonding of individual surrogate particles to the fibrous matrix at more than one point is advantageous. Heat-bonding may be achieved by, for instance, the addition to the fibrous web of surrogate particles heated to an appropriate elevated temperature, or by heating the web to an appropriate elevated temperature after the surrogate particles have been added to the web. The fixed surrogate particles may be only on the web surface, or within the web, or on the web surface and within the web. Heat-bonding without application of pressure to the surrogate particles/fibrous matrix structure, beneficially avoids reduction or distortion of the spacing between the surrogate particles.

The surrogate particles will typically have an average diameter in the range of from about 100 microns to about 1 mm to 10 mm, preferably about 0.3 mm to 2 mm, may be in the form of beads, granules and so forth, and may vary in shape from spheroidal beads to irregularly shaped particles. Generally speaking, the surrogate particles will have an appropriate size to be entrapped by the web structure. However, the surrogate particles may also be fixed by being preheated to an elevated temperature and then added to the web.

The fibrous matrix may be loaded with about 20% to 95% by weight of the surrogate particles, based on the combined weight of the surrogate particles and of the matrix fiber. In selecting the loading, consideration should be given to providing adequate surface area for deposition of the selected amount of fine, mobile active particles on the surrogate particles. A higher weight percent loading of one type of surrogate particle than another type of surrogate particle, will not necessarily result in more surface area for deposition. For instance, a high loading of low density surrogate particles could result in high available surface for deposition, yet constitute only a low weight percent, for instance, 25 wt. %. If surrogate particles similar in density to activated carbon or zeolite or alumina are chosen, the fibrous matrix will typically be loaded with about 50% to 90% by weight of the surrogate particles, depending, of course, upon in particular the surface area required for deposition. Generally speaking, a relatively higher volume of the fibrous matrix occupied by the surrogate particles, will provide for tortuous flow paths in the fibrous matrix.

In accordance with the invention, fixed surrogate particles carry immobilized, fine active particles. Although a variety of fine particles having a useful function may be used, beneficial fine particles will typically function in a fibrous structure in accordance with the invention, to produce a useful processing effect such as an alteration, change or chemical modification of a component or components of a liquid or gas in contact with the fine particles; a useful analysis; or a useful filtration or separation function. Useful processing effects include killing or inactivating or attenuating harmful bacteria and viruses, and chemically modifying undesirable inorganic contaminants. Useful diagnostic tests include those relating to DNA. The function of the fine active particles may be enhanced by functional activity of the surrogate particles or by the functional activity of another substance or material.

Fine active particles intended for use in the present invention, are characterized by mobility or irregular motion when suspended in a liquid or a gas, and thus will have an average size in the range of from about 0.01 to 10 microns. Although submicron active particles are preferred, the present invention is applicable to fine particles up to 100 microns in average size. In any event, the average size of the active particles will be on the order of approximately 0.01 to 0.0001 of the average size of the surrogate particles. Therefore, a relatively larger average size of the active particles requires a larger average size of the surrogate particles.

In accordance with the invention, the surrogate particles will advantageously have pores or cavities, or pores and cavities large enough for access to the inner surface of the surrogate particles and deposition therein of fine active particles, and for accessibility thereafter to the immobilized fine particles. Thus, the average pore size will be sufficiently larger than the average fine particle size so that clogging of the pores by the fine particles is minimized and the gas or liquid can contact the immobilized fine particles. In addition for accessibility, it will be beneficial for the fine particles to be deposited in a monolayer. Accordingly, it is highly preferred that the available surface for deposition be at least approximately equal to, or be slightly in excess of, the surface needed for monolayer deposition. Therefore, the relative average size of the fine active particles is significant as to whether or not particular surrogate particles will provide adequate surface area for deposition, in particular monolayer deposition, and accessibility thereafter to the immobilized fine particles. As will be understood, the deposition will take advantage of the entire available surface, that is, both inner and outer surface, of the surrogate particles.

Exemplary functionally useful organic and inorganic compounds in the form of fine particles, include materials useful for processing, analysis, filtration and separation. Processing effects include public health and medical applications using fine particles as modifiers of inorganic contaminants, and biocidal fine particles, and include chemical applications using chemically reactive fine particles, and catalysis by catalytic fine particles, and so forth. Exemplary fine particulate, processing materials include silicates, synthetic amorphous silica and alumina. Analytically useful fine active particles for medical, veterinary and other diagnoses, may be used. Alternatively or in addition, fine active particles such as activated carbon powder, may provide filtration. Fine active particles that perform a useful separation by removing one component from another component, may also be used. The fine active particles will be selected depending upon the end use or function desired. The foregoing description is intended to be representative of and not in limitation of useful fine particles. The fine active particles may be used alone, or in combination with another functionally active substance or substances. In addition to the surrogate particles, the fibrous structure may include, to the extent consistent with the need for selective deposition on the surrogate particles, other particles significantly larger than the fine particles, and these optional large particles may be functionally active.

In accordance with the invention, a functionally effective amount of fine active particles is post-fixation, immobilized on the fixed surrogate particles. In this way, when the surrogate particles are fixed by bonding and also in the case of fiber-fiber bonding, bonding is not interfered with by fine particles covering the bonding surface of fibers. The loading of the fine particles will vary depending upon factors including the intended function and the comparative effectiveness of the chemical or physical nature of the fine particles for the intended function. Accordingly, to obtain comparable functional activity, a relatively greater amount of relatively less effective, fine particles will be used, whereas a relatively smaller amount of relatively more effective, fine particles will be appropriate. In any event, by the present invention, a functionally effective amount of the fine particles is immobilized, yet the fibrous structure will have acceptably low pressure drop.

In accordance with the invention, fine, mobile active particles are beneficially selectively deposited on fixed surrogate particles. By "selective" is meant significantly more, preferably substantially exclusive, deposition on the surrogate particles than on other available surface of the fibrous structure. To provide for selective deposition, the surrogate particles and the fine active particles will be chemically or physically, specifically attractive to one another; accordingly, when the surrogate particles are fixed by bonding to the fibrous matrix, point-of-contact bonding advantageously minimizes undesirable masking of an attractive force, by the bonding material. A variety of methods and techniques may be selected from, for the selective deposition, depending upon factors including the basis for the selective deposition, the chemical and physical properties of the fine particles and the surrogate particles, and the need to maintain the structural integrity of the fibrous matrix. Useful active deposition methodologies include chemical or physical modification, grafting, plasma treatment, electrocharging, electrodeposition, chemical bonding and other suitable techniques. If heat is applied in a deposition methodology, the temperature selected should be less than that at which the desired product, including the fibrous matrix, is adversely affected. The deposition should be not only selective but also efficient so as to minimize loss, and to maximize the immobilization, of fine, mobile active particles.

Depending upon the deposition methodology, the chemical and physical properties of the surrogate particles and the fine active particles, and other considerations, the fine active particles may be immobilized on and in the surrogate particles in various ways. The immobilization may be by attractive association with, or being physically held or chemically bonded or otherwise attached to, the surrogate particles. Regardless, the immobilization must maintain accessibility to the fine active particles, and must be efficient to minimize loss of the fine active particles during use; and the manner of immobilization must be appropriate for the size of the fine particles. If chemically bonded, covalent chemical bonding could be an appropriate choice depending upon the surface chemistry, for instance, bonding sites, of the surrogate particles, and the size and chemistry of the fine particles. To effect immobilization, the surrogate particles and/or fine particles may be chemically or physically modified to be specifically attractive to one another, for instance, to have attractive charges.

FIG. 1 shows at 20 a sectional view through a non-woven fibrous structure in accordance with the invention. A plurality of individual fibers 22 form an open web 24, and define an upper surface 26 and a lower surface 28 of the web. Beneficially, the fibrous matrix of the web is generally uniform and surrogate particles 30 are distributed in a generally uniform, three dimensionally spaced apart arrangement within the web. Alternatively, the surrogate particles could be deposited on the web surface only, or on the web surface and within the web.

The fibrous structure of FIG. 1 is advantageously dry formed from crimped staple macrofiber. Dry forming, and in particular carding, advantageously provides an open, generally uniform fibrous structure, and thereafter for controlled introduction and spacing of dissimilar matter such as surrogate particles 30, with accessibility, yet tortuous paths, in the surrogate particle-loaded structure for gas or fluid flow.

Figure 2:
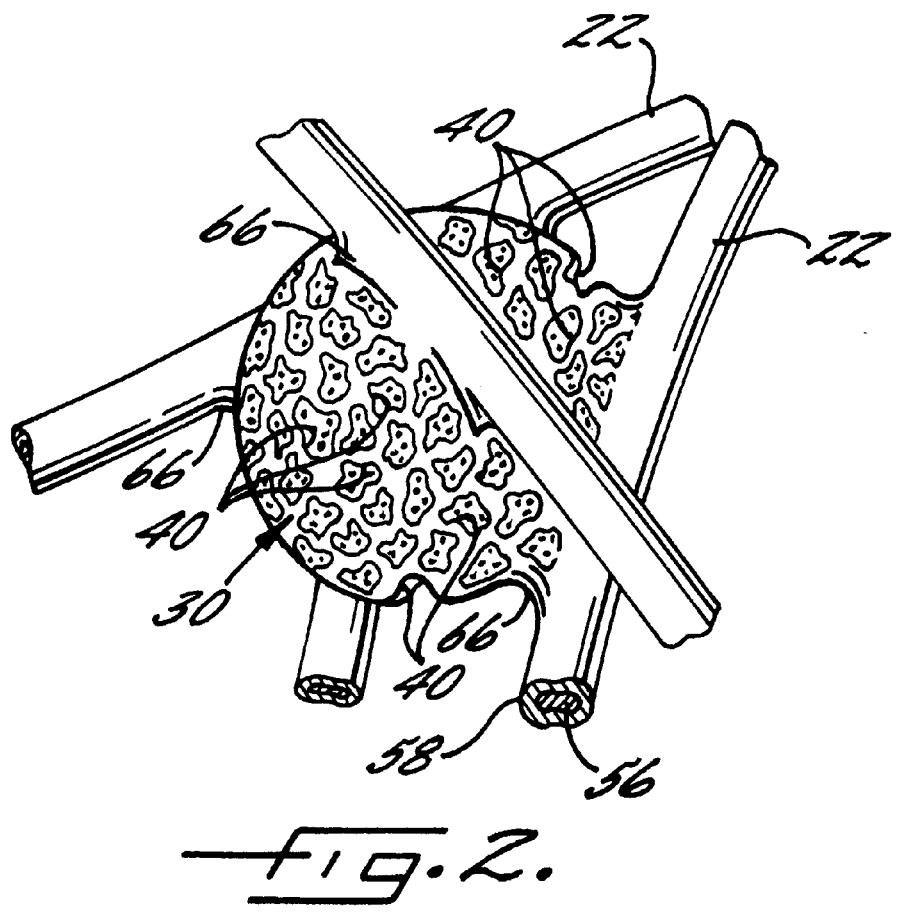
FIG. 2 is an enlarged view of a surrogate particle bearing immobilized fine active particles, and entrapped within an interstitial space of, and bonded to, fibers of the fibrous structure of FIG. 1.

The surrogate particles are beneficially fixed so as to be maintained in a spaced apart relationship. Referring to FIG. 2, surrogate particles are advantageously entrapped in interstices of the fibrous matrix and bonded to the fibrous matrix. Representative surrogate particle 30 has an irregular surface with surface cavities 40 of varying sizes. Immobilized in cavities 40 are fine active particles, represented as dots or small circles disposed on the walls of and within the cavities. In addition, though not shown in FIG. 2 for reasons of simplifying the drawing, fine active particles are also immobilized on the exterior surface of surrogate particles. Suitable surrogate particles will have pores and/or cavities large enough to accommodate the fine active particles to be deposited, and for accessibility of a gas or liquid to the immobilized fine particles. It is undesirable for the relative average size of the fine particles to be so close to the average pore size that the fine particles clog pores, because clogging will reduce the availability and efficacy of the immobilized fine active particles to produce the intended functional result. In accordance with the invention, there is selective deposition of the fine active particles on the surrogate particles because of preferential attraction between the fine active particles and the surrogate particles, and the fine active particles are immobilized on fixed surrogate particles. Beneficially, the deposition on the available surface of the surrogate particles, is in a monolayer. In this way, a high loading of fine active particles is provided in a relatively small volume with accessibility.

As also shown in FIG. 2, fibers 22 are advantageously sheath/core composite fibers each having a core 56 and a lower melting sheath 58. The surrogate particles are beneficially bonded to the fibers at numerous points 66, the bonding being preferably localized, and fiber-to-fiber bonding at cross over points of the fibers stabilizes the web structure. Because the bonding is effected prior to the deposition of the fine active particles, the bonding is not interfered with by fine particles covering the bonding surface of the fibers. In addition, if the fine active particles were immobilized on the surrogate particles and the surrogate particles thereafter deposited in the fibrous structure, bonding of the surrogate particles to the fibrous structure would detrimentally coat immobilized fine active particles, as well as block and obstruct pores and cavities containing immobilized fine active particles, to a degree depending upon, for instance, the bonding technology used.

A fibrous structure in accordance with the invention, may have in contact therewith one or more other layers. These layers may be nonwovens including partially densified nonwovens and melt blown webs, woven fabrics, knit fabrics, porous membranes and so forth. These layers may be laminated to or otherwise suitably attached to the inventive fibrous structure, and may exert a useful function if desired.

Uses for the fibrous structure of this invention, include pharmaceutical, medical and biotech processing and filtration, blood processing including of whole blood and blood components, food and beverage processing and filtration, diagnostic medical and veterinary uses, and air and liquid filtration and separation uses. Important to these uses is the immobilization of the fine active particles, and accessibility of the gas or liquid to the immobilized fine active particles.

The fibrous structure may be used as is or in various forms or devices. The fibrous structure may be used singly or in combination with other fabrics, filter media, films, plastics and membranes.

In a beneficial dry forming process for making the fibrous structure of FIG. 1, a carding machine cards crimped fiber and forms an open non-woven web 20 on an endless moving belt. Surrogate particles 30 are applied to web 20 from, for instance, a shaker. Web 20 is open to an appropriate degree and surrogate particles 30 are of appropriate size and weight to become entrapped in the interior of the web. Then, heat is advantageously applied without pressure to the surrogate particles/fibrous matrix structure to provide for adhesion of the surrogate particles to the fibrous matrix and for fiber-fiber bonding. In this way, a fibrous matrix is formed, and thereafter surrogate particles are distributed in a three dimensional arrangement and fixed to a stabilized fibrous matrix.

Other ways of fixing the surrogate particles may be used. A heat-bonding step, if used, is carried out at a sufficient elevated temperature less than the melting point of the structural fiber component and for a suitable period of time to cause adhesion of the surrogate particles to the structural fiber. The fibrous structure is then cooled.

Thereafter, in accordance with the invention, fine, mobile active particles are added to the stabilized surrogate particles/fibrous matrix structure and based upon a preferential attraction between the fine, mobile particles and the fixed surrogate particles, the fine, mobile particles are selectively deposited and immobilized on and in the surrogate particles. A suitable deposition methodology is selected consistent with the considerations previously described; thus, the deposition may be preceded by providing the surrogate particles and fine active particles with attractive charges or forces. Accordingly by this invention, there is also provided a method by which a stabilized fibrous matrix with fixed surrogate particles is prepared, and thereafter fine, mobile active particles are selectively deposited and immobilized on the fixed surrogate particles using suitable deposition conditions.

The present invention may be carried out with various modifications without departing from the spirit or essential attributes thereof, and accordingly, reference should be made to the appended claims, rather than to the foregoing specification as indicating the scope of the invention.

We claim:

1. A fibrous structure comprising surrogate particles bearing functionally active, fine particles, wherein said surrogate particles are entrapped in and bonded to a fibrous matrix in a three dimensional arrangement, wherein the average size of said functionally active, fine particles is on the order of approximately 0.01 to 0.0001 of the average size of said surrogate particles, wherein said functionally active, fine particles are disposed on said surrogate particles in a significantly greater amount than on said fibrous matrix, and are immobilized on said surrogate particles.

2. The fibrous matrix of claim 1, wherein said surrogate particles comprise pores, and wherein a portion of said functionally active, fine particles is disposed within said pores.

3. The fibrous structure of claim 2, wherein said fine particles are of an average size sufficiently smaller than the average size of said pores, for accessibility to said portion of immobilized fine particles by a gas or liquid.

4. The fibrous structure of claim 1, wherein said fine particles are in a monolayer.

5. The fibrous structure of claim 1, wherein said average size of said functionally active, fine particles is in the range of from about 0.01 to 10 microns.

6. The fibrous structure of claim 1, wherein the immobilization of said fine active particles is by attractive association with, or attachment to, said surrogate particles.

7. The fibrous structure of claim 1, wherein said surrogate particles are selected from the group consisting of carbon particles, zeolite particles, alumina particles, polymeric particles and absorbent particles.

8. The fibrous structure of claim 1, wherein said three dimensional arrangement is a generally uniform, three dimensionally spaced apart arrangement.

9. The fibrous structure of claim 8, comprising tortuous flow paths.

10. The fibrous structure of claim 1, wherein said fine particles have a function selected from at least one of a processing function, analytical function and sorptive function.

11. The fibrous structure of claim 1, wherein said fibrous matrix comprises composite fiber comprising a heat-bondable fiber component, and wherein said surrogate particles are bonded to said fibrous matrix by said heat-bondable component.

12. The fibrous structure of claim 1, wherein said surrogate particles are high available surface, surrogate particles and further comprising at least one layer disposed on or within said fibrous structure.

13. A fibrous structure comprising high available surface, surrogate particles bearing functionally active, fine particles, wherein said surrogate particles are entrapped in and bonded to a fibrous matrix in a three dimensional arrangement, wherein the average size of said fine particles is on the order of approximately 0.01 to 0.0001 of the average size of said surrogate particles, and wherein said functionally active, fine particles are immobilized on said surrogate particles.

14. The fibrous structure of claim 13, wherein said surrogate particles comprise pores, and wherein a portion of the immobilized fine particles is disposed within said pores.

15. The fibrous structure of claim 14, wherein said fine particles are of an average size sufficiently smaller than the average size of said pores, for accessibility to said portion of immobilized fine particles by a gas or liquid.

16. The fibrous structure of claim 13, wherein said fine particles are in a monolayer.

17. The fibrous structure of claim 13, wherein the immobilization of said fine active particles is by attractive association with, or attachment to, said surrogate particles.

18. The fibrous structure of claim 13, wherein said fine particles have a function selected from at least one of a processing function, analytical function and sorptive function.

19. The fibrous structure of claim 13, wherein said fibrous matrix comprises composite fiber comprising a heat-bondable fiber component, and wherein the bonding to said fibrous matrix is by said heat-bondable component, further comprising at least one layer disposed on or within said fibrous structure.

* * * * *